United States Patent [19]

Morgan

[11] 4,397,963
[45] Aug. 9, 1983

[54] METHOD FOR FABRICATING CERMETS OF ALUMINA-CHROMIUM SYSTEMS

[76] Inventor: Chester S. Morgan, Oak Ridge, Tenn., granted to U.S. Department of Energy under the provisions of 42 U.S.C. 2182

[21] Appl. No.: 308,738

[22] Filed: Oct. 5, 1981

[51] Int. Cl.³ ............................................. C04B 35/10
[52] U.S. Cl. ................................. 501/127; 75/0.5 BC; 75/235; 501/153
[58] Field of Search .................. 501/127, 153; 75/235, 75/0.5 BC

[56] References Cited

U.S. PATENT DOCUMENTS

| | | | |
|---|---|---|---|
| 4,124,737 | 11/1978 | Wolfa et al. ...................... | 75/0.5 BC |
| 4,126,654 | 11/1978 | Montgomery et al. ............. | 501/153 |
| 4,234,338 | 11/1980 | Morgan et al. ....................... | 75/235 |

*Primary Examiner*—Mark Bell
*Attorney, Agent, or Firm*—C. Clay Carter; Stephen D. Hamel; Richard G. Besha

[57] ABSTRACT

Cermet insulators resistant to thermal and mechanical shock are prepared from alumina-chromium systems by providing an $Al_2O_3$ material of about 0.5 to 7.0 micron size with a solid-hydrocarbon overcoating by slurring an effective amount of said solid hydrocarbon in a solvent mixture containing said $Al_2O_3$ and thereafter evaporating said solvent, contacting said coated $Al_2O_3$ with a solution of chromium precursor compound, heating the resulting mixture in a reducing environment to a temperature above the decomposition temperature of said chromium precursor compound but less than the melting temperature of the $Al_2O_3$ or chromium for sufficient duration to yield a particulate compound having chromium essentially dispersed throughout the $Al_2O_3$, and then densifying said particulate to provide said cermet characterized by a theoretical density in excess of 96% and having 0.1 to 10.0 vol.% elemental chromium metal present therein as a dispersed phase at the boundaries of the $Al_2O_3$ material. Cermet components prepared thereby are useful in high temperature equipment, advanced heat engines, and nuclear-related equipment applications where electrical or thermal insulators are required.

9 Claims, No Drawings

METHOD FOR FABRICATING CERMETS OF ALUMINA-CHROMIUM SYSTEMS

The invention is a result of a contract with the United States Department of Energy.

FIELD OF THE INVENTION

This invention relates to the ceramic and metallurgical arts and, more specifically, to making shock-resistant cermets of alumina and chromium or chromium alloys.

Ceramic materials have potential applications as high-temperature structural materials and components. One of the principal limitations to pure oxide ceramics, however, is their brittleness or lack of ductility. The inclusion of a ductile metal phase within the ceramic to produce a cermet is known within the art to increase mechanical strength, toughness, and thermal shock resistance. The resultant article may be either an insulator or conductor depending upon metal to ceramic proportions and the particle size and distribution of the metal within the ultimate sintered cermet.

A typical procedure for producing cermets is described in commonly assigned U.S. Pat. No. 4,234,338 issued Nov. 18, 1980 to Chester S. Morgan and William R. Johnson. Cermets of $Al_2O_3/Pt$ are produced therein by forming a physical mixture of ceramic powders of $Al_2O_3$ and Pt precursor, selectively decomposing said precursor in a hydrogen environment by exposure of the physical mixture to heat of sufficient temperature and duration to produce discrete Pt metal particles adhering to the $Al_2O_3$ powder surfaces, and densifying the resultant powder to provide a cermet insulator of superior thermal shock resistance and insulating capacity. Because the low metal content of 0.1 to 20 vol.% occurs as a dispersed (discontinuous) phase within the cermet, the ultimate cermets are particularly suited as insulation for instrumentation applied in nuclear-reactor loss-of-coolant tests.

The substitution of Cr and other metals for the more expensive Pt metal precursor of U.S. Pat. No. 4,234,338 was also described therein. However, the disclosed operating parameters of the patented process were reported at column 4, lines 60 through 65 to need further characterization for the $Al_2O_3/Cr$ system. Cermets of $Al_2O_3/Cr$ have proven impractical or inefficient to make by this patented process. Cr metal precursors therein apparently resist reduction in the presence of a readily available oxygen source such as $Al_2O_3$. Further, physical mixtures of $Al_2O_3$ and uniformly distributed fine particle size Cr are difficult to achieve because the particle size of Cr is usually larger than desired. This larger particle size renders impractical homogeneous mixtures of Cr within $Al_2O_3$ and results in an elemental metal tendency to agglomerate or localize on the individual ceramic powders. These difficulties detrimentally affect the ultimate cermet quality in relation to its insulating capacity and mechanical or physical properties.

Inasmuch as the disclosure of commonly assigned U.S. Pat. No. 4,234,338 provides information useful in an understanding of the materials and testing procedures utilized herein, as well as the requisite physical and mechanical properties of the cermet, this patent is incorporated herein by reference.

SUMMARY OF THE INVENTION

It is, therefore, an object of the present invention to provide an efficient method for making a uniform particulate mixture of $Al_2O_3$ and Cr or Cr alloy wherein the Cr constituent is dispersed as surface nodules on a plurality of $Al_2O_3$ grains.

It is another object of the invention to provide a cermet article derived by densifying said particulate mixture into a compact having improved compressive strength and thermal shock resistance.

It is still a further object of the invention to provide such a cermet of greater than 96% theoretical density and compressive strength of about 3.0 GPa which is able to withstand repetitive cycles of thermal stress while substantially maintaining the aforementioned mechanical integrity and physical properties.

These and other objects are provided according to this invention in a method for preparing $Al_2O_3/Cr$ or $Al_2O_3/Cr$ alloy cermets containing 0.1 to 10.0 vol.% metal present as a dispersed phase and comprising the steps of: providing a plurality of $Al_2O_3$ grain with a solid-hydrocarbon coating contacting the coated grains with a solution of a Cr or Cr alloy precursor compound, heating the resultant solution in a reducing environment to a temperature above the decomposition temperature of the Cr or Cr alloy precursor compound and less than the melting temperature of the $Al_2O_3$ or Cr for a duration sufficient to yield a particulate mixture having an elemental Cr or Cr alloy phase dispersed within a predominant $Al_2O_3$ phase, and densifying the particulate mixture to provide a cermet characterized by a theoretical density in excess of 96% and 0.1 to 10.0 vol.% of Cr or Cr alloy present therein as a dispersed phase at the boundaries of the $Al_2O_3$ grains.

DETAILED DESCRIPTION

It has been discovered that cermets having a homogeneous dispersion of about 0.1 to 10.0 vol.% Cr or Cr alloy present as a minor phase and the balance present as a major phase of $Al_2O_3$ can be accomplished by compaction of a unique mixture of $Al_2O_3/Cr$ or $Al_2O_3/Cr$ alloy particulates. These particulate mixtures are prepared by first coating individual $Al_2O_3$ grains with a solid-hydrocarbon barrier and thereafter contacting said overcoated $Al_2O_3$ with a solution containing a Cr or Cr alloy precursor. This is followed by heating to release volatiles and to thermally decompose the Cr or Cr alloy precursor to produce elemental globules tightly adhering to the individual $Al_2O_3$ grains within a substantially uniform particulate mixture of $Al_2O_3/Cr$ or $Al_2O_3/Cr$ alloy heretofore believed to be unattainable.

Inclusions of about 0.1 to 10.0 vol.% Cr or Cr alloy are thought to be optimal in the practice of the present invention to produce cermets of desirable mechanical strength, toughness, and thermal shock resistance. Cermets from about 0.1 to 5.0 vol.% Cr or Cr alloy have been easily fabricated and cermets with a preferred range of about 0.1 to 3.0 vol.% metal are believed to be ideal for components in high temperature equipment, advanced heat engines, and nuclear-related equipment applications where electrical or thermal insulators are needed. Based upon mechanical and related testing disclosed more fully hereinafter, the subject cermets compare favorably with $Al_2O_3/Pt$ cermets or $Al_2O_3$ composites alone.

In a typical operating cycle of the subject method, $Al_2O_3$ is preferably employed in about the 0.5 to 7.0 micron size range. Particle size of the $Al_2O_3$ is not crucial, but it has been discovered that predominant amounts of the $Al_2O_3$ within the submicron size range permits densification to about 96% T.D. by sintering at 1680° C. without the application of pressure.

Suitable solid hydrocarbons for use in our process for providing uniform overcoatings about individual $Al_2O_3$ particles or grains are octacosane ($C_{28}H_{58}$), pentatriacontane ($C_{35}H_{72}$), or a mixture of longchain hydrocarbons such as paraffin. These overcoatings are applied according to the subject method by slurring the $Al_2O_3$ grains with the solid hydrocarbon in an organic solvent such as hexane, benzene or toluene and thereafter evaporating the solvent. The duration for this process step is not important so long as an adequate coating of hydrocarbon is applied. This is best determined by a net weight gain in the material after coating of about 7 weight percent.

Although the exact mechanism is not clear, it is believed that this hydrocarbon coating on the individual $Al_2O_3$ particles facilitates reduction of Cr or Cr alloy precursor compounds by functioning as an oxygen getter during the decomposition process thereby isolating Cr or Cr alloy from a readily available source of oxygen, i.e. ceramic or precursor compound, which is thought to have rendered prior processes impractical, particularly in the $Al_2O_3$/Cr or $Al_2O_3$/Cr alloy systems. The fact that this unique feature of the present invention readily accomplishes the desired degree of Cr or Cr alloy precursor decomposition and dispersal of the metal within the ceramic is unexpected. Especially in view of the suggested modifications to the procedure set forth in U.S. Pat. No. 4,234,338 at column 5, lines 2-16.

Elemental Cr precursor compounds utilized in the subject method are typically $Cr(NO_3)_3.9H_2O$ or $CrCl_3$. Suitable Cr alloy precursors are also nitrate or chloride salts of the desired metals. Sufficient metal precursor should be added to an amount of the hydrocarbon coated $Al_2O_3$ to provide about 0.1 to 10.0 vol.% in the cermet. Additions below 0.1 vol.% are not sufficient to impart the desired mechanical and physical properties. Additions above 10.0 vol.% are prone to make the resultant particulate unsuitable for making nonconductive cermets with a dispersed (discontinuous) phase of metal.

The Cr or Cr alloy precursors are best applied to the overcoated $Al_2O_3$ by confining said material within a container and contacting it with a solution of Cr or Cr alloy precursor solutes. Aqueous solvents are preferred but other solvents or colloidal suspensions may also be utilized. Concentrated methyl, ethyl, or propyl alcohol may thus be used to deposite the metal precursor as a film over each ceramic grain or particle. Volatiles are removed from this contacted mixture by gentle heating and stirring until a dried particulate mixture suitable for cermet making is attained.

The Cr or Cr alloy precursor is thermodynamically decomposed while directly in contact with the overcoated $Al_2O_3$ by confinement of a physical mixture of this particulate within a suitable environment of reducing gases or a vacuum for an appropriate duration. Typically, the reducing gas is hydrogen. As a general rule, the reducing gas pressure during the decomposition process is from about one to three-quarters atmosphere.

Decomposition of the Cr or Cr alloy precursor in the subject method occurs at a temperature in excess of the decomposition temperature of the metal precursor, but at a temperature below the melting temperature of $Al_2O_3$ or Cr and Cr alloy. The maximum temperature used should be maintained at least 100° C. below the ceramic or metal melting temperatures. Reported melting temperatures for $Al_2O_3$ are about 2000° C. and decomposition temperatures for $Al_2O_3$/Cr or $Al_2O_3$/Cr alloy systems of the subject method are within a range of about 1000° C. to 1500° C. The range 1100° C. to 1350° C. is preferred for best results. Temperatures above 1500° C. tend to deleteriously oxidize Cr in the subject method while temperatures below 1000° C. are insufficient to volatize the hydrocarbon coating from the $Al_2O_3$ grains. The retention of significant quantities of carbon formers in the powder is undesirable because carbide formation and embrittlement may occur in the cermet during hot pressing. To assure complete decomposition of metal precursor and hydrocarbon compounds with minimum oxidation of the metal within the particulate, the selected Cr precursor decomposition temperature is attained by rapid heating and then holding for about ten minutes. Dependent upon the temperature used, the heating schedule, the metal precursor compound, and the solid hydrocarbon compositions, longer or shorter holding times may be used.

Microscopic examination of the resultant cermet particulate mixture will give an indication of its suitability for application in making insulative cermets desired for deployment by practice of the instant invention. Suitable particulate mixtures should appear uniform with elemental metal globules or modules appearing as very small and discrete particles tightly adhering to the surfaces of the individual ceramic particles or grains. In order to avoid formation of a continuous phase during subsequent densification and to improve thermal shock resistance by increasing the number of defects (metal nodules) which stop or divert cracks, it is desirable that the nodules be relatively small as compared to the $Al_2O_3$ particles. Rapid temperature increase during the precursor reduction tends to increase the nucleation sites and therefore the number of metal nodules. The reduction temperature is held as low as feasible so as to reduce metal nodules growth by agglomeration.

This ultimate particulate mixture of elemental metal and ceramic can be densified by conventional pressing techniques to produce a suitable compact of any desired shape such as rod, pellets, or disks. The cermet article produced in accordance with this invention is preferably prepared by hot pressing although cold pressing, as hereinbefore mentioned, or other conventional densification procedures can also be applied. For a typical hot-pressed cermet, pressures of about 55.2 MPa and temperatures of about 1600° C. applied in vacuum for fifteen minutes have been used in the subject method to produce $Al_2O_3$ cermets of excellent thermal shock resistance containing 0.1 to 10.0 vol.% Cr dispersed as a discontinuous metal phase. For Cr alloy and other metal cermets, somewhat higher or lower temperatures and pressures may be required, their exact determination being a matter of routine scoping for a skilled artisan. Sintered cermets, i.e., prepared without pressure, were also obtained for the $Al_2O_3$/Cr system by heating a compact to 1680° C. in a hydrogen environment for 15 to 30 minutes to attain a cermet of 96% theoretical density.

It is believed that the thermal shock resistance of cermets prepared according to this invention results from a finely dispersed metal phase primarily at the Al₂O₃ grain boundaries. The metal phase and stress fields around the metal phase stop or divert cracks thereby enhancing the crack resistance of the cermet. Also, it is possible that the metal phase mechanically bind grains of discrete Al₂O₃ particles together permitting a small amount of movement between grains on exposure to thermal stresses, thereby relieving thermal stresses while continuing to bond the ceramic particles together.

The following examples are intended to provide a more detailed understanding of the present invention and to demonstrate its effectiveness in preparing dense cermets of the requisite mechanical and physical properties. In these examples, cermets of the Al₂O₃/Cr or Al₂O₃/Cr alloy system are prepared. However, as will be apparent to those skilled in the pertinent art, other ceramics and metals may be selected for particular use environments of the ultimate article produced by the method of the present invention with appropriate variations in operating conditions. Such variations or modifications are contemplated as equivalents to the instant disclosure. For appropriate alternatives to Al₂O₃ see Col. 3 of the aforementioned patent for candidate materials. One must be more selective for alternative to Cr in the practice of this invention but metal precursor compounds such as $MoO_3$, $WO_3$, $ReCl_3$, $Th(NO_3)_4$ and $U(NO_3)_4$ are suitable.

EXAMPLE I

Preparation of Al₂O₃-Cr Cermets

One hundred grams of 0.5 to 7.0 micron Al₂O₃ was slurried in about 150 ml of hexane containing 7.0 gm of paraffin. The hexane was thereafter evaporated by gentle heating to provide a homogeneous paraffin overcoating on the dried Al₂O₃ grains.

Fourteen grams of $Cr(NO_3)_3.9H_2O$ dissolved in 100 ml of concentrated ethyl alcohol was added to a container of this hydrocarbon-coated material. The resulting slurry was dried to a powder while being heated and stirred. Further volatile removal was accomplished by confinement of the resultant powder within a drying oven at about 100° C. for 60 minutes.

This dried Al₂O₃/paraffin/$Cr(NO_3)_3.9H_2O$ powder was heated under about one atmospheric H₂ pressure to reduce $Cr(NO_3)_3$ to Cr. A first heating stage took place in vacuum in 500° C./hr increments until a temperature within the range of 200° to 300° C. was attained thereby permitting loosely bonded water to escape. A second more-rapid heating stage then took place under ¾ atmospheric H₂ pressure as the temperature was increased to about 1350° C. in about 5 to 8 minutes. This temperature was held for a period of 10 minutes to assure complete decomposition of $Cr(NO_3)_3$. Microscopic and visual examination of the resultant Al₂O₃/Cr particulate mixture revealed a dark gray powder containing visible Cr metal globules adhering to the surfaces of Al₂O₃ grains.

This particulate mixture was densified by hot pressing in a vacuum at about 1600° C. and about 55.2 MPa (8,000 psi) for 15 minutes using POCO graphite dies. Pellets of about 0.6, 1.3, and 1.5 cms in diameter were thus produced by this procedure. The resultant pellets were examined and found to be well-formed with no cracks or other apparent defects. They possessed greater than 98% of theoretical density and Cr metal presence was confirmed by x-ray diffraction studies. Metallographic examination of the resultant cermets showed a fine dispersion of a discontinuous metal phase of about 1.0 vol.% Cr within the Al₂O₃ matrix.

Thermal shock resistance of a sample of the hot pressed pellets was determined by repeatedly quenching in water at about 70° C., pellets that had been heated previously to about 500° C. The cermet pellets had significantly higher thermal shock resistance than Al₂O₃ pellets made in the same manner but without Cr metal dispersions. Many pellets of 0.6, 1.0, and 1.5 cm diameters prepared by the present invention had no helium leaks after 50 quench cycles. Small cracks in the pellets were observed upon microscopic examination, but usually did not make a complete circuit to permit helium leaks. The cermet pellets did not fracture or disintegrate during these cycles.

Relative strength examination of 0.6 cm diameter pellets by compressive strength and three-point bending tests showed Al₂O₃/Cr cermets prepared by the method of the present invention to be stronger (3.0 GPa) and much preferred over Al₂O₃ alone (2.58 GPa) or Al₂O₃/Pt cermets (2.63 GPa) as described in the aforementioned patent.

EXAMPLE II

Preparation of Al₂O₃/Cr alloy cermets

The procedures of Example I were repeated with a combined metal precursor of $Cr(NO_3)_3.9H_2O$ and $Ni(NO_3)_2.6H_2O$ of sufficient proportions to produce a cermet powder having 50 wt.% Cr and 50 wt.% Ni present as a Cr, Ni alloy.

Cermets possessing the properties provided by the present invention are particularly suited as insulators for instrumentation in nuclear-reactor loss-of-coolant accident studies and testing where high electrical resistances of about $10^6$ ohm-cm or greater may be required across the insulator.

It is thus readily apparent that the subject invention provides an economically attractive method for the preparation of Al₂O₃/Cr or Al₂O₃/Cr alloy cermets in a simple, cost-effective process. Cr and Cr alloy incorporation into cermets below about 20 vol.% by fine particle deposition has heretofore been thought difficult if not impractical. This limitation of the art has been essentially obviated by the method of the present invention which is capable of producing Al₂O₃/Cr or Al₂O₃/Cr alloy cermets containing a dispersed metal phase of about 0.1 to 10.0 vol.% which are equivalent to or comparable with cermet articles of the aforementioned patent. Significant cost savings are thereby accomplished by substitution of Cr or Cr alloys for Pt.

What is claimed is:

1. A method for fabricating a cermet of Al₂O₃/Cr or Cr alloy, characterized by 0.1 to 5.0 vol.% of metal present as a dispersed phase and comprising the steps of:
   (a) coating a ceramic material with a solid hydrocarbon;
   (b) contacting said coated material with a solution of a chromium compound;
   (c) heating said contacted mixture in a reducing environment to a temperature above the decomposition temperature of said chromium compound and less than the melting temperature of the ceramic material for sufficient duration to yield a particulate compound having a discontinuous chromium phase dispersed within a ceramic phase; and
   (d) densifying said particulate to provide a cermet having 0.1 to 5.0 vol.% chromium or chromium alloy present therein as a dispersed phase largely at the boundaries of the ceramic material grains.

2. The method of claim 1 wherein the Cr metal precursor compound is $Cr(NO_3)_3$ or $CrCl_3$ and the ceramic material is $Al_2O_3$.

3. The method of claim 1 wherein the ceramic material coating of step (a) is provided by slurrying $Al_2O_3$ with an organic solvent selected, from the group consisting of hexane, benzene, and toluene, and a suitable amount of solid hydrocarbon compound selected from the group consisting of paraffin, octacosane, and pentatricontane, so as to provide a coating on the $Al_2O_3$ of sufficient mass to provide the $Al_2O_3$ with about a 7 wt.% net weight gain upon evaporation of the solvent.

4. The method of claim 1 wherein the heating step (c) is carried out within the range of 1000° C. to 1500° C.

5. The method of claim 1 wherein the Cr alloy precursor compound comprises sufficient proportions of chloride or nitrate salts, selected from the group consisting of $Cr(NO_3)_3$, $CrCl_3$, $Ni(NO_3)_2$, $NiCl_2$, and mixtures thereof, to produce a cermet particulate mixture having substantially equivalent proportions by weight of Ni and Cr.

6. The method of claim 1 wherein the $Al_2O_3$ particle size ranges from about 0.5 to 7.0 microns.

7. The method of claim 4 wherein the reducing environment is about 1.0 to 0.75 atmospheres of hydrogen gas.

8. A thermal shock resistant and electrical insulating cermet producd by the method of claim 1.

9. The article of claim 8 wherein said metal phase is uniformly dispersed as a discontonuous phase through said article.

* * * * *